United States Patent
Lim et al.

(10) Patent No.: US 8,413,038 B2
(45) Date of Patent: Apr. 2, 2013

(54) SYSTEM FOR DOWNLOADING DIGITAL CONTENT PUBLISHED IN A MEDIA CHANNEL

(75) Inventors: Seh Eing Lim, Singapore (SG); Guan Chuan Choo, Singapore (SG)

(73) Assignee: Creative Technology Ltd, Singapore (SG)

( * ) Notice: Subject to any disclaimer, the term of this patent is extended or adjusted under 35 U.S.C. 154(b) by 944 days.

(21) Appl. No.: 12/092,529

(22) PCT Filed: Oct. 30, 2006

(86) PCT No.: PCT/SG2006/000318
§ 371 (c)(1),
(2), (4) Date: May 2, 2008

(87) PCT Pub. No.: WO2007/053115
PCT Pub. Date: May 10, 2007

(65) Prior Publication Data
US 2008/0276158 A1  Nov. 6, 2008

Related U.S. Application Data

(63) Continuation-in-part of application No. 11/265,942, filed on Nov. 2, 2005, now Pat. No. 7,793,206.

(51) Int. Cl.
*G06F 3/048* (2006.01)
*G06F 7/00* (2006.01)

(52) U.S. Cl. ........ 715/201; 715/205; 715/716; 715/794; 715/968; 707/713; 707/805; 707/913

(58) Field of Classification Search .......... 715/200–205, 715/209, 231, 234, 238, 239, 249, 251, 255, 715/256, 273, 719, 727, 731, 732, 760, 210, 715/226, 243, 700, 704, 716, 723, 736, 741, 715/744, 746, 747, 756, 761, 794, 860, 861, 715/864, 968, 969; 707/705, 707, 713, 805, 707/913, 914, 915, 916, 917, 918
See application file for complete search history.

(56) References Cited

U.S. PATENT DOCUMENTS 6,987,221 B2 * 1/2006 Platt .............................. 84/601
7,205,471 B2 * 4/2007 Looney et al. .................. 84/615
(Continued)

FOREIGN PATENT DOCUMENTS

WO  2002/008928 A1  1/2002

OTHER PUBLICATIONS

Wikipedia, 'iTunes' URL: http://en.wikipedia.org/wiki/Itunes Last accessed on: Apr. 23, 2008.

*Primary Examiner* — Maikhanh Nguyen
(74) *Attorney, Agent, or Firm* — Creative Technology Ltd

(57) ABSTRACT

There is provided a system for downloading digital content to a portable media player, the digital content being published in a media channel by a content creator. The system may reside on a server accessible via the Internet. The system may comprise: a data receiver module to receive the digital content from the media channel via a communication medium; a conversion module to convert the received digital content to at least one format for consumption by the player; and a download module to copy the at least one file to the portable media player. The system may further comprise a player detection module to detect file formats compatible with the portable media player. A corresponding method is also disclosed.

10 Claims, 8 Drawing Sheets

U.S. PATENT DOCUMENTS

| | | | |
|---|---|---|---|
| 7,676,590 B2* | 3/2010 | Silverman et al. | 709/231 |
| 7,769,903 B2* | 8/2010 | Robbin et al. | 709/248 |
| 7,827,259 B2* | 11/2010 | Heller et al. | 709/223 |
| 7,925,973 B2* | 4/2011 | Allaire et al. | 715/248 |
| 2002/0141584 A1* | 10/2002 | Razdan et al. | 380/203 |
| 2003/0033331 A1* | 2/2003 | Sena et al. | 707/513 |
| 2003/0085913 A1* | 5/2003 | Ahmad et al. | 345/730 |
| 2003/0126086 A1* | 7/2003 | Safadi | 705/51 |
| 2003/0182471 A1* | 9/2003 | Harris et al. | 709/328 |
| 2004/0001106 A1* | 1/2004 | Deutscher et al. | 345/838 |
| 2004/0055446 A1* | 3/2004 | Robbin et al. | 84/615 |
| 2004/0064476 A1* | 4/2004 | Rounds | 707/104.1 |
| 2004/0086120 A1* | 5/2004 | Akins et al. | 380/240 |
| 2004/0123725 A1* | 7/2004 | Kim | 84/609 |
| 2004/0170374 A1* | 9/2004 | Bender et al. | 386/46 |
| 2005/0080915 A1* | 4/2005 | Shoemaker et al. | 709/231 |
| 2005/0091107 A1* | 4/2005 | Blum | 705/14 |
| 2005/0132264 A1* | 6/2005 | Joshi et al. | 715/500.1 |
| 2005/0240494 A1* | 10/2005 | Cue et al. | 705/27 |
| 2005/0240661 A1* | 10/2005 | Heller et al. | 709/219 |
| 2006/0036610 A1* | 2/2006 | Wang | 707/10 |
| 2006/0100978 A1* | 5/2006 | Heller et al. | 707/1 |
| 2006/0156236 A1* | 7/2006 | Heller et al. | 715/716 |
| 2006/0163358 A1* | 7/2006 | Biderman | 235/472.01 |
| 2006/0212401 A1* | 9/2006 | Ameerally et al. | 705/51 |
| 2006/0248209 A1* | 11/2006 | Chiu et al. | 709/231 |
| 2006/0258289 A1* | 11/2006 | Dua | 455/41.3 |
| 2007/0038931 A1* | 2/2007 | Allaire et al. | 715/526 |
| 2007/0136778 A1* | 6/2007 | Birger et al. | 725/117 |
| 2008/0256378 A1* | 10/2008 | Guillorit | 713/400 |

\* cited by examiner

SYSTEM FOR DOWNLOADING DIGITAL CONTENT PUBLISHED IN A MEDIA CHANNEL

TECHNICAL FIELD

The invention concerns a system for downloading digital content to a portable media player, where the digital content is published in a media channel by a content creator.

BACKGROUND OF THE INVENTION

A podcast is a digital recording of a radio broadcast or similar programme, made available on the Internet in a number of separate files for downloading to a personal audio player. Apart from audio content, other digital content such as images, photos, text and videos may also be web cast to portable media players, on demand.

Really Simple Syndication (RSS) is a popular news feed syndication format for podcasting to a portable media player. RSS has made it easier for users to manage and subscribe to more pod casts.

A familiar problem is that after completing the download process, the digital media is unable to be consumed in the original order intended by the content creator. This may be because the content is not stored in the original order or cannot be categorized in the original order. The problem is exacerbated when more than one type of digital content is downloaded. Typically, the file system of a portable media player organizes digital content in a series of directories or folders according to its file type even though multiple files are related to the same multimedia web cast. The inability to preserve the playback order reduces the enjoyment for the user since they must either tediously arrange the files in the correct order or sacrifice experiencing some digital content.

SUMMARY OF THE INVENTION

In a preferred embodiment of the present invention, there is provided a system for downloading digital content to a portable media player, the digital content being published in a media channel by a content creator. The system may reside on a server accessible via the Internet. The system may comprise: a data receiver module to receive the digital content from the media channel via a communication medium; a conversion module to convert the received digital content to at least one format for consumption by the player; and a download module to copy at least one file to the portable media player. The system may further comprise a player detection module to detect file formats compatible with the portable media player. Advantageously, the file enables the digital content to be consumed in the same order that the digital content is published in the media channel by the content creator. The predetermined file format may be selected according to display and audio capabilities of the portable media player. The predetermined file format may be any one from the group consisting of, but not limited to, MPG, MPEG, AVI, MOV, WMV, ASF, MP3, WMA, and MID. It is advantageous that the predetermined file format enables user configuration of chapter markers in the (video) file for convenient frame manipulation.

Preferably, the digital content is at least one from the group consisting of: text, images, audio, and video. The media channel may be any one from the group consisting of: web cast, and a pod cast. The digital content may be received by the data receiver module in the order the digital content is published in the media channel. It is advantageous that if the digital content is text, the conversion module paginates the text based on the size of the display of the portable media player, converts each page of text into a video frame, and creates a slideshow by combining the video frames into the (video) file. The audio content of the audio file may be enhanced, and the video stream of the video file may include any one from the group consisting of: playback visualizations, single frame video containing channel artwork and/or description of the content together with audio properties such as Album Name, Artist and Content Category, and random images selected from the player grouped together as a slideshow. The filename of the video file may be in the form of: [YYMMDDHHMM]-[CHANNEL NAME]-[FILENAME].AVI. Such a form of file naming may aid in enabling the digital content to be consumed in the same order that the digital content is published in the media channel by the content creator.

It is advantageous that the at least one file is stored in a single location on the portable media player, the single location being any one from the group consisting of: directory, folder and node. It is preferable that the player detection module also detects display capability and audio capability of the portable media player including screen size, resolution, contrast level, audio bit rate, or stereo capability.

Preferably, if the digital content is an image, the conversion module converts each image into a common image format, scales the image to a resolution supported by the portable media player, and converts each image into a video frame for the video file. Special or transition effects may be applied to the image when the video file is created. Background music may also be added as part of the audio stream of the video file to provide an enhanced multimedia experience to the user.

It is preferable that if the digital content is an audio file, the conversion module converts the audio file to a predetermined audio format supported by the portable media player and converts the audio content of the audio file to an audio stream of the video file.

It is advantageous that if the digital content is a video file that is in a video format not natively supported by the portable media player, the conversion module transcodes the video file into a video format natively supported by the portable media player.

There is also provided a method for downloading digital content to a portable media player, the digital content being published in a media channel by a content creator. The method may comprise: receiving the digital content from the media channel via a communication medium; converting the received digital content to at least one file of a predetermined format; and copying the at least one file to the portable media player. Advantageously, the file may enable the digital content to be consumed in the same order that the digital content is published in the media channel by the content creator. The method may also comprise detecting file formats compatible with the portable media player, and/or selecting the predetermined file format according to suitability for the portable media player.

A system for downloading digital content to a portable media player is also disclosed. The digital content may be published in a media channel by a content creator. The system may comprise: a user interface to be displayed to the user in response to a user action, the user interface enabling digital content to be selectively downloaded directly to the portable media player; and a download module to receive the selected digital content from the media channel via a communication medium and to transmit the selected digital content to the portable media player without making a local copy. The system may further comprise a conversion module to convert the received digital content to at least one file of a predetermined format; wherein the file enables the digital content to be consumed in the same order that the digital content is published in the media channel by the content creator. The user action may be any one from the group consisting of clicking a link or button to download digital content. The system may be in the form of an OCX/Active X plugin for a web browser application. The user interface may further comprise a download location input field to indicate the storage location for a local copy of the digital content.

It is preferable that the download module receives the selected digital content in a memory buffer temporarily storing data relating to the digital content before the digital content is saved to the portable media player. The download module may maintain the digital rights of the content creator of the digital content.

Preferably, the user interface comprises a plurality of columns including: title of the digital content, file size of the digital content, release date of the digital content and brief description of the digital content; a checkbox associated with each digital content to indicate whether the digital content is to be downloaded; and a portable media player selection field to indicate the type of the portable media player. The plurality of columns may further include name of the media channel, author of the digital content, artwork, URL of the digital content and language of the digital content.

Advantageously, the download module may insert additional content selected from the group consisting of: notices and advertisements.

BRIEF DESCRIPTION OF THE DRAWINGS

An example of the invention will now be described with reference to the accompanying drawings, in which.

DETAILED DESCRIPTION OF THE DRAWINGS

Figure 1:
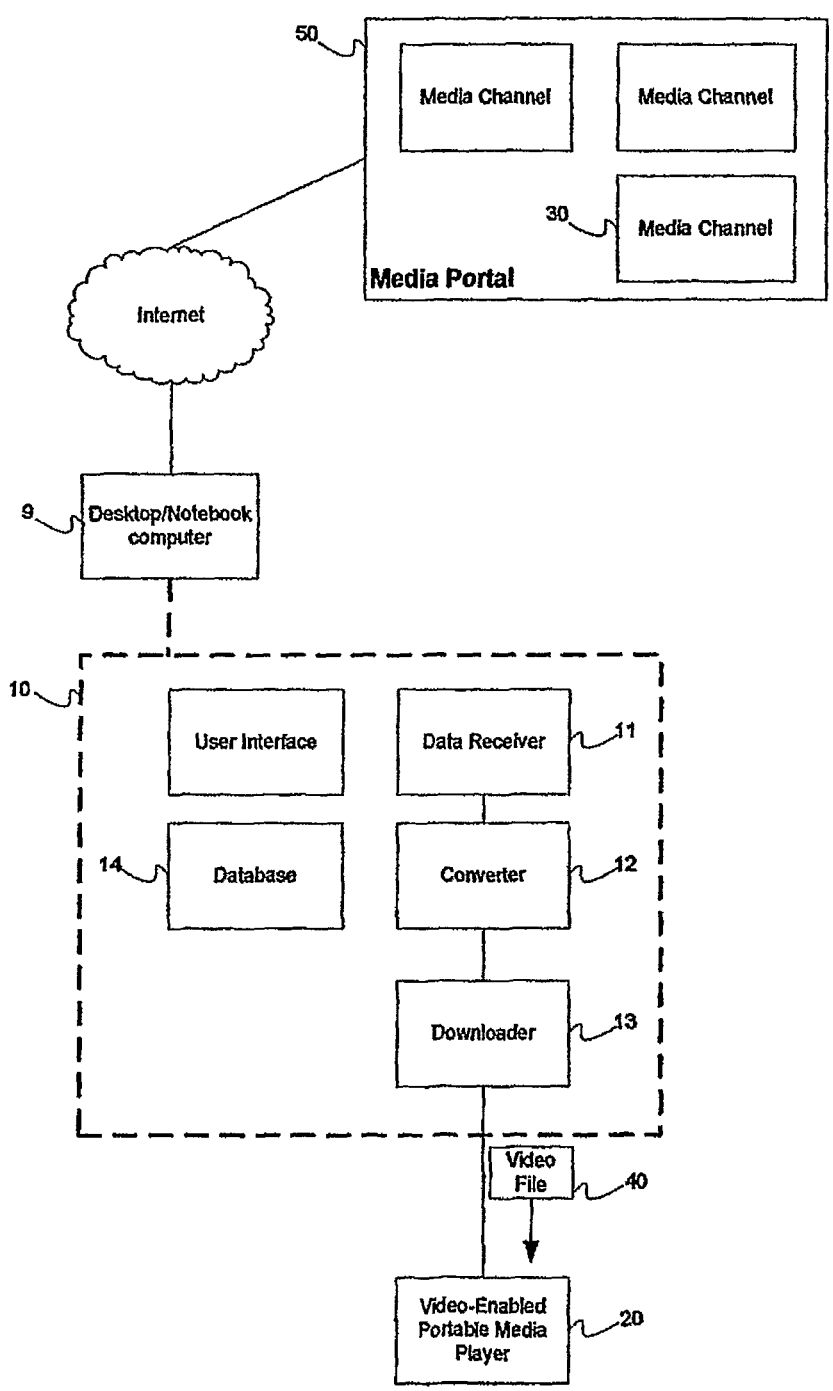
FIG. 1 is a block diagram of the system in accordance with a preferred embodiment of the present invention.

FIG. 1 and the following discussion are intended to provide a brief, general description of a suitable computing environment in which the present invention may be implemented. Although not required, the invention will be described in the general context of computer-executable instructions, such as program modules, being executed by a computer such as a personal computer, laptop computer, notebook computer, tablet computer, PDA and the like. Generally, program modules include routines, programs, characters, components, data structures, that perform particular tasks or implement particular abstract data types. As those skilled in the art will appreciate, the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 3:
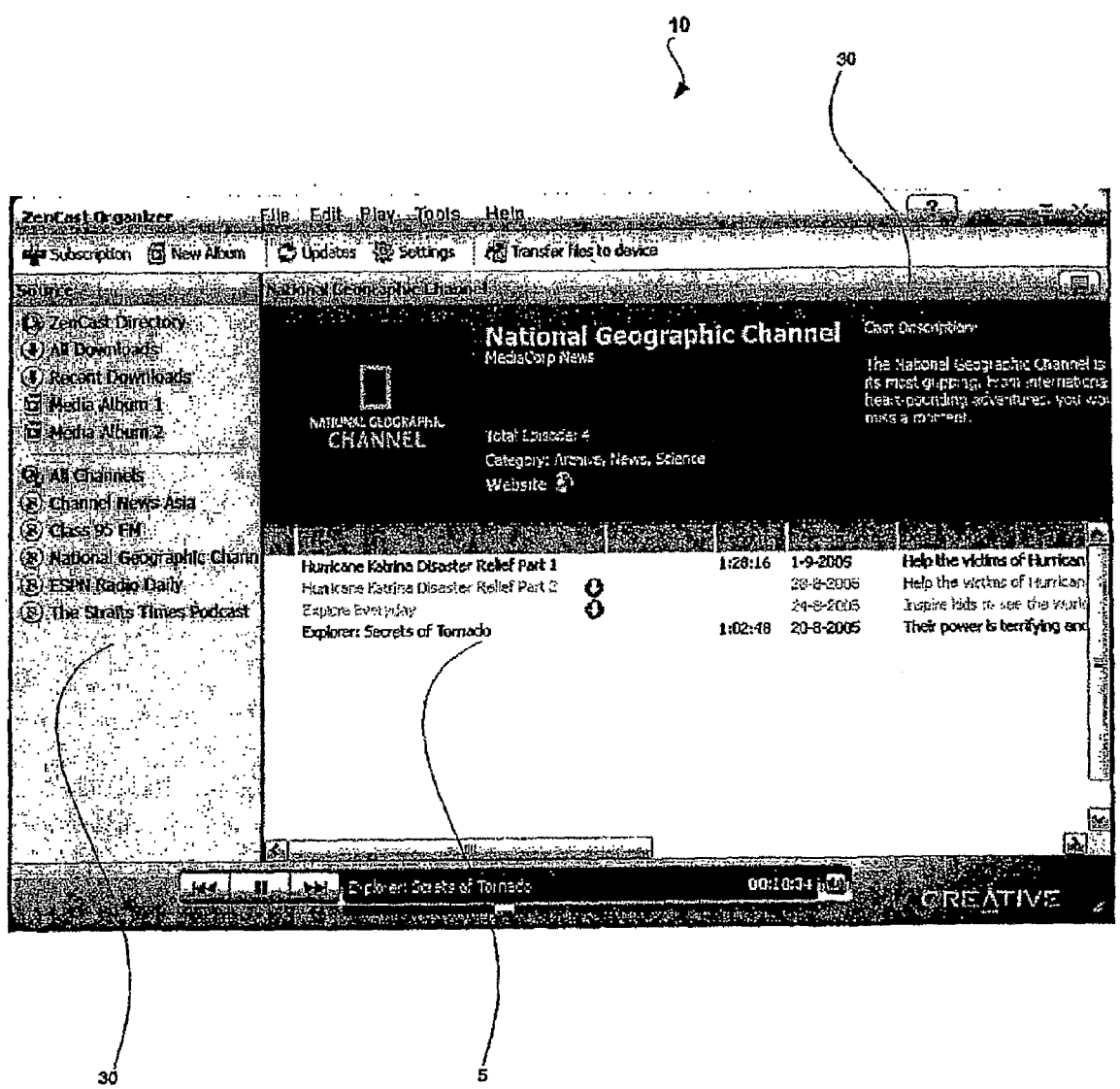
FIG. 3 is a screenshot of the system embodied as a client-based application.

Referring to FIGS. 1 and 3, a system 10 for downloading digital content 5 to a video-enabled portable media player 20 is provided. The digital content 5 is published in a media channel 30 by a content creator. The system 10 generally comprises a data receiver module 11, a conversion module 12 and a download module 13. The data receiver module 11 receives the digital content 5 from the media channel 30 via a communication medium, for example, the Internet. The conversion module 12 converts the received digital content 5 to a video file 40 of a predetermined video format. The predetermined video format may be non-proprietary formats such as MPG, MPEG, AVI; and also proprietary formats such as Apple™ QuickTime™ MOV, Microsoft™ ASF and WMV. It is conceivable that other file formats may also be applicable. The download module 13 then copies the video file 40 to the player 20. The video file 40 ensures the digital content is consumed in the same order that the digital content is published in the media channel 30 by the content creator. It should be noted that when the digital content is downloaded to a non video-enabled portable media player, the digital content may still be consumed in the same order that the digital content is published, except only with audio and without any image(s). Audio formats that may be consumed may include MP3, Microsoft™ WMA, and MID.

Any type of digital content 5 is converted into a video file 40 before transferring to the player 20. Digital content 5 includes text, photos, music and video. The system 10 enables web casters and podcasters to create digital content 5 in any digital format using any type and publish it using RSS. When the system 10 downloads digital content 5 to a desktop computer 9 via the Internet, the digital content is able to be consumed by the user in exactly same order as how the content is published in the media channel 30.

The system 10 allows user to consume (playback, view, listen and experience) the digital content directly from their desktop computer 9, or allows them to consume the digital content from their player 20. Preferably, the user chooses the latter by connecting their player 20 to their desktop computer 9 to check and synchronise with the media portal 50 or media channel 30 and automatically select new digital content 5. To enhance convenience, not only is the content for the subscribed media channels 30 automatically updated, but the conversion to video of all digital content 5 is performed automatically by the system 10.

To enable consumption of the digital content from the player 20, the system 10 transfers each podcast/webcast of each channel 30 of the digital content into the player 20 as an individual video file 40. The transfer process converts all downloaded digital content 5 into video format as video frames or the audio stream of the video format, and preserves the playback order of the digital content when it is played back in the player 20. The video display of the player 20 is leveraged for all digital content that requires a display such as images and video content. Also, for a pod cast/web cast that is primarily audio content, the display is also leveraged. For example, a desired image for a pod cast is displayed by the player 20 whilst playing the audio. The album art may be static throughout the audio playback or change periodically, depending on the intent of the content creator.

For text-based digital content, the conversion module 12 performs the following:
1. Text-based content is paginated based on the screen size of the player 20 connected to the desktop computer 9;
2. Each page is converted to a video frame;
3. A slideshow is then created based on each of these video frames and stored into an AVI file (or any video format supported by the player 20) using a suitable video encoder (for example, MJPEG);
4. Each page may be configured to be displayed for a predetermined amount of time, such as, for example, one minute;
5. If the player 20 supports video bookmarks, each page is bookmarked so that a user can navigate through the slideshow using controls on the player 20;
6. The filename of the output video file 40 is created based on the template [YYMMDDHHMM]-[CHANNEL NAME]-[FILENAME].AVI
7. Background audio may be added to the slideshow The file 40 is preferably date/time stamped as files 40 may be downloaded more than once per day.

Figure 4:
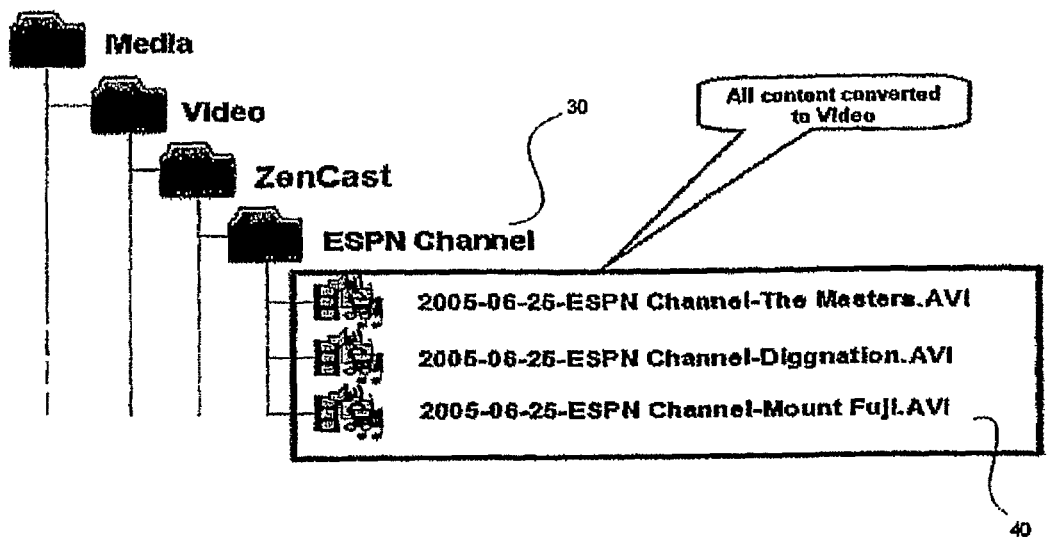
FIG. 4 is a storage diagram of the folders of the system.

For image-based digital content such as photos, the conversion module 12 performs the following:
1. Each photo is converted into an image format (such as JPEG), and scaled to a resolution that is supported by the player 20 connected to the desktop computer 9;
2. Each photo is converted into a video frame and all video frames are saved into a video file 40 using a suitable video encoder (e.g. MJPEG). Special effects and transition effects may be applied to the photos when the video file 40 is created. Special effects may include:
   a. Zoom in during initial display and zoom out before ending display;
   b. Sliding photo into view;
   c. Other animations or video frame transitions;
   d. Fanciful borders and inline imaging.
3. Each video file 40 plays back for certain period time. The duration of the video file 40 and video frame rate is user configurable;
4. Background music may be added as part of the audio stream of the video file 40 for an enhanced multimedia experience;
5. The filename of the output video file 40 is generated based on the template [YYMMDDHHMM]-[CHANNEL NAME]-[FILENAME].AVI For audio-based digital content such as MP3s and music, the conversion module 12 performs the following:
1. Each audio file is converted to a predetermined audio format (such as, for example, MP3, WMA and so forth) compatible with and supported by the player 20 connected to the desktop computer 9;
2. Each audio file is then converted into an AVI (or any video format supported by the player 20) using MP3 as the audio stream. When converting the audio file, the audio may be enhanced, for example, using proprietary technology like Creative Technology's Crystallizer. The audio bit rate and frequency range may be modified to maximise the capabilities of the player 20;
3. The video portion of the AVI file can be any one of the following:
   a. Playback visualizations (for example, as those seen in Windows™ Media Player or WinAmp™);
   b. Single frame video containing channel/album art and description of the content together with audio properties such as Album Name, Artist and Content Category;
   c. Random pictures selected from the player 20 are grouped together as a slideshow.
4. The filename of the output video file 40 is created based on the template [YYMMDDHHMM]-[CHANNEL NAME]-[FILENAME].AVI For video-based digital content, the conversion module 12 performs the following:
1. Video files 40 that are compatible with the desktop computer 9 but are not natively supported by the player 20 are transcoded using a predetermined video converter residing in the conversion module 12 before transfer to the player 20.
2. The filename of the output video file 40 is created based on the template [YYMMDDHHMM]-[CHANNEL NAME]-[FILENAME].AVI Playback of folder-based digital content is not restricted to only the order in which the content is copied to the player 20 or alphabetical order of the content. In addition to the use of video files 40, the system 10 ensures the playback order of digital content of a media channel 30 corresponds with the intention of the content creator because:
1. Digital content files 5 are copied in the order from the media channel 30 in which the digital content is ordered and organized in the media channel 30;
2. The filenames of the output video files 40 are generated based on the template:
[YYMMDD]-[CHANNEL NAME]-[FILENAME].AVI;
3. All content within a media channel 30 are displayed and copied to a single video folder in the player 20. FIG. 4 depicts the digital content after conversion to video files 40 in a single folder (ESPN) named after the media channel 30.

A local database 14 is included with the system 10 which maintains records regarding the technical capabilities of the players 20 which have previously connected to the desktop computer 9. The database 14 also stores details of files converted and transferred to player 20. This means that the query process to a previously connected player 20 is less intensive and thus minimises overall download time to the player 20.

Figure 2:
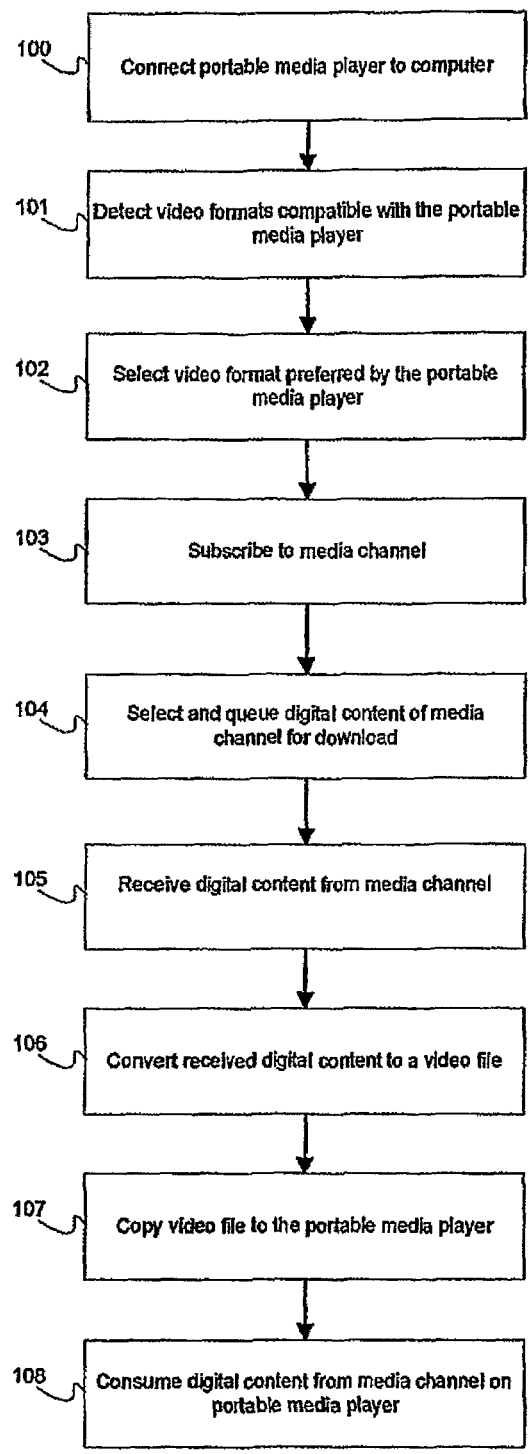
FIG. 2 is a process flow diagram of a downloading method in accordance with a preferred embodiment of the present invention.
Figure 6:
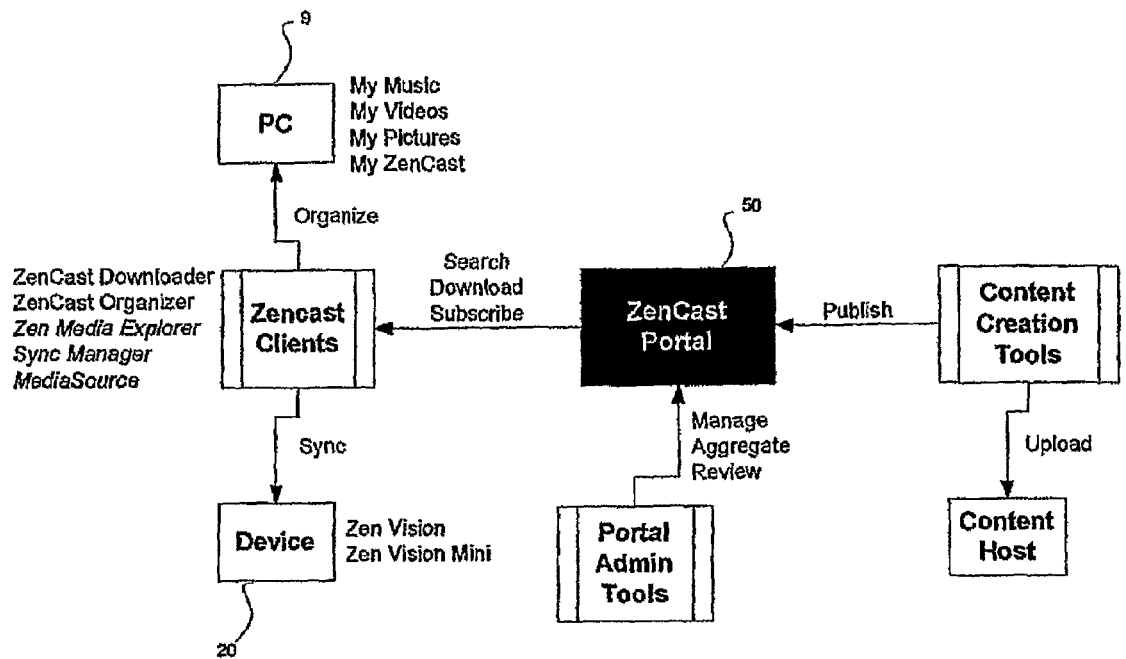
FIG. 6 is an activity diagram for publishing and downloading digital content.
Figure 7:
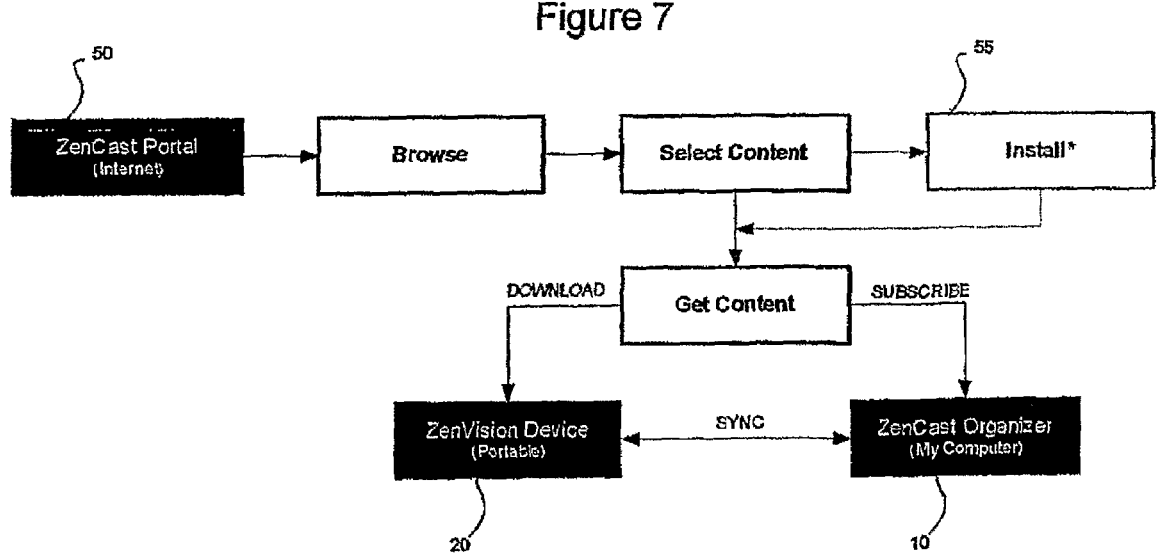
FIG. 7 is an activity diagram for selecting and downloading digital content.

Referring to FIGS. 2, 6 and 7, in a typical scenario, the user uses the system 10 to browse via the Internet for a media portal 50 in search of a media channel 30 or pod cast/digital content. The user connects 100 their player 20 to their computer 9 to download new digital content to their player 20. The system 10 comprises a player detection module to detect the connection and queries the player 20 for its video, audio and storage capabilities. The results of the query are stored in the local database 14 for future use if this is the first time the player 20 has connected to the computer 9. The system 10 detects 101 video formats that are compatible with the player 20. Of those compatible video formats, the video format most preferred by the player 20 is selected 102 to convert the digital content into. The user subscribes 103 to the media channel 30 and the details of the channel 30 are presented in the main window of the user interface of the system 10. Various digital content are presented in a list in the main window, as depicted in FIG. 3, for the user to download to their player 20. The user is able to queue 104 selected digital content from the media channel 30 for download to their player 20. The queued digital content is downloaded 105 from the media channel 30 by the data receiver module 11. Next, the digital content is converted 106 by the conversion module 12 and downloaded 107 to the player 20 by the download module 13. Alternatively, the data receiver module 11 may download the queued digital content prior to the player 20 connecting with the computer 9. The received digital content is stored on the computer 9 until the player 20 is connected. When the player 20 connects, the conversion and download process commences. The user disconnects the player 20 from the computer 9, and later, consumes 108 the digital content in the exact order the content creator has published in the media channel 30.

Figure 5:
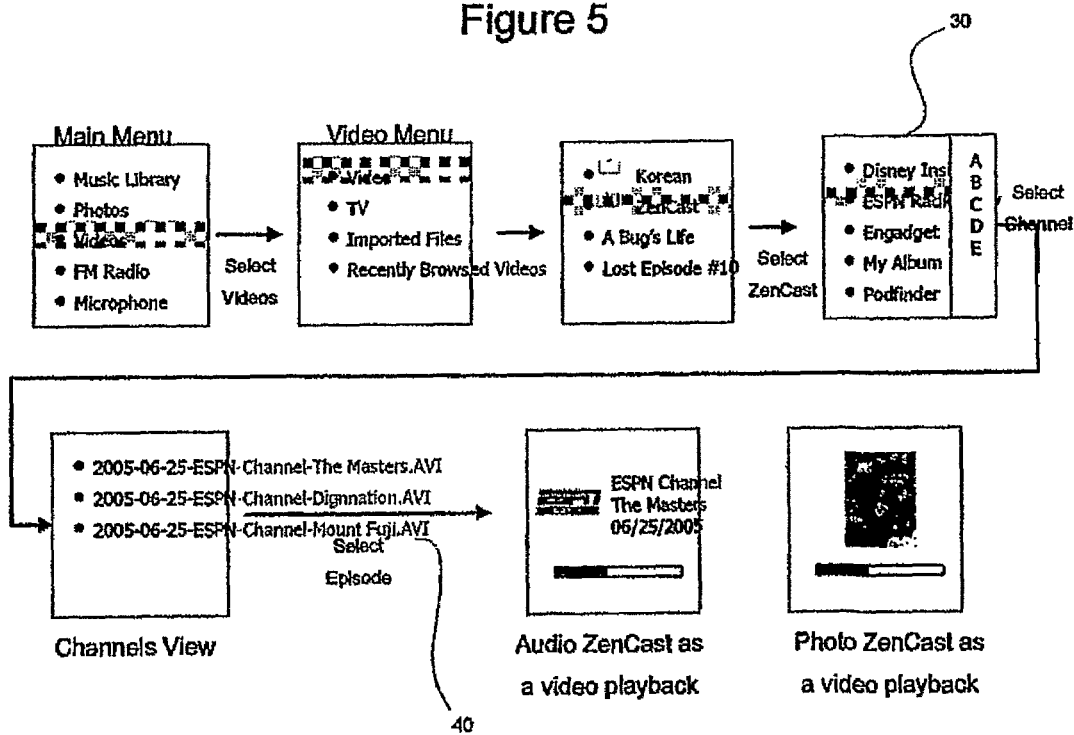
FIG. 5 is a navigation flow diagram of media playback on the portable media device.

Referring to FIG. 5, the player 20 has a menu driven navigation system. To consume digital content on the player 20, the user begins from the Main Menu. The user navigates to the Video Menu and proceeds to the Video menu item. The user then selects the media channel 30 they are interested in. In this subcategory, the user may then consume desired digital content, for example, episodes published in the media channel 40, in the form of video files 40. Alternatively, an option for "Zencast" may be found in the main menu.

Figure 8:
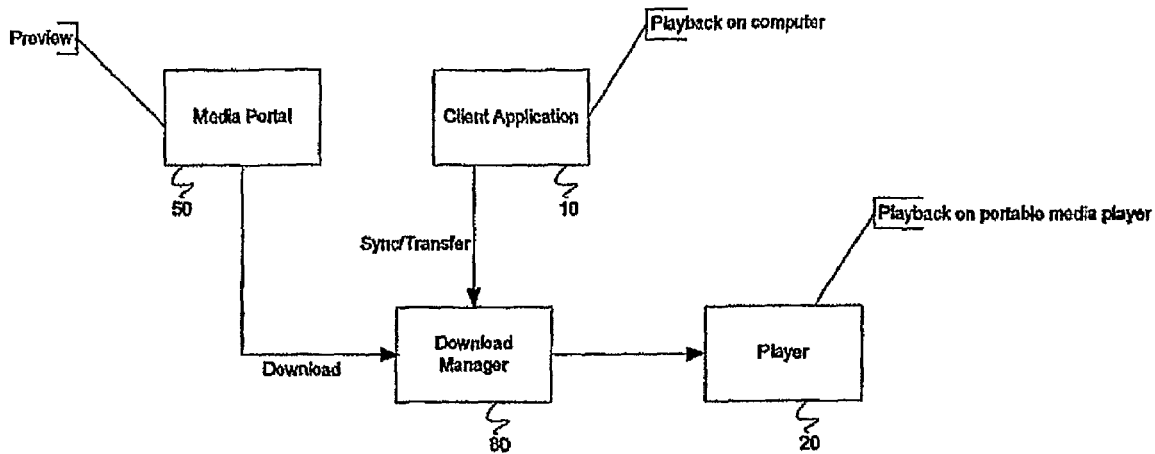
FIG. 8 is an activity diagram for downloading digital content in accordance with a second embodiment of the present invention.
Figure 9:
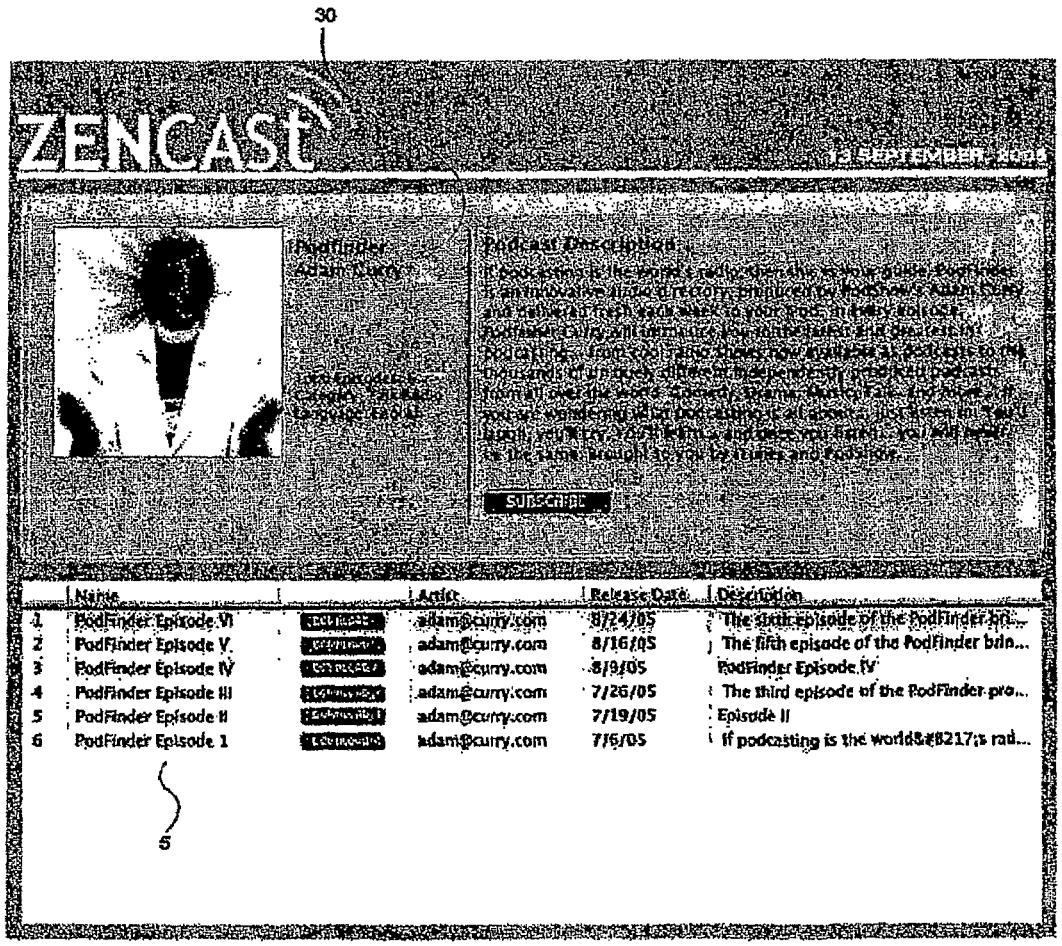
FIG. 9 is a screenshot of a media channel for use with the second embodiment of the present invention.
Figure 10:
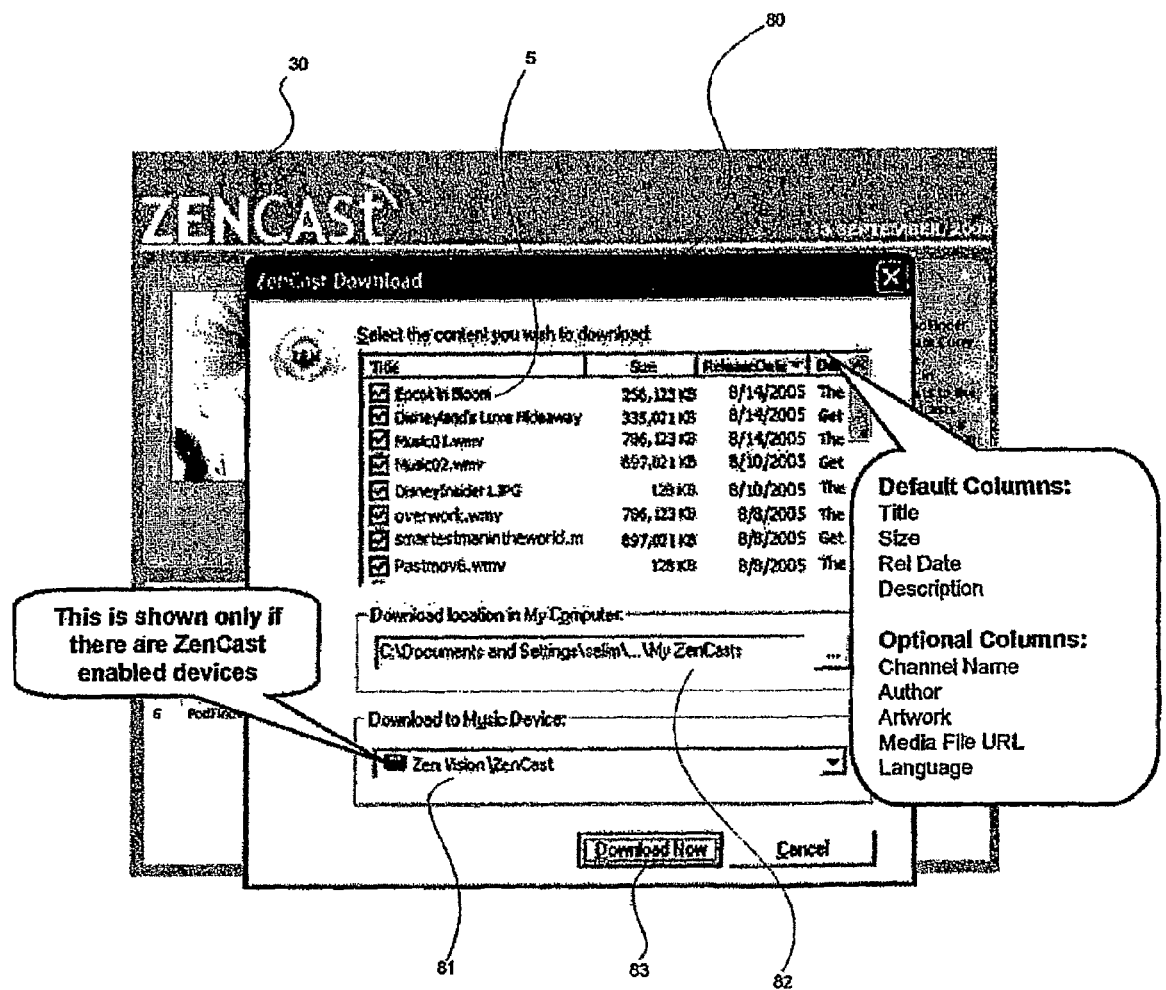
FIG. 10 is a screenshot of the download manager in accordance with the second embodiment of the present invention.

Referring to FIGS. 8 to 10, a second embodiment of the system 10 is provided in the form of a download manager. The system 10 comprises a user interface 80 and a download module. The user interface 80 is displayed to the user in response to a user action, for example, clicking a link or button to download digital content 5, from a media channel 30. Preferably, the user interface 80 is launched by the web browser application as it is a web plugin. The plugin may be an ActiveX/OCX component. If the plugin has not been installed previously, the browser will prompt the user to download and install it. When the browser detects a specific file extension or file type, the user interface 80 is launched and appears above the media channel 30 web page. Once the user interface 80 is launched, it is present in the background to detect any further digital content 5 queued for download. The user interface 80 enables digital content 5 to be selectively downloaded directly to the player 20. The download module receives the selected digital content 5 from the media channel 30 via the Internet and transmits the selected digital content 5 to the player 20 without making a local copy. This avoids the need for the user to specify a download folder on the computer 9 and then navigate to the download folder and copy the contents to the player 20. The download module receives the selected digital content in a memory buffer temporarily storing data relating to the digital content before the digital content is saved to the player 20. However, the user interface 80 may comprise a download location input field to indicate the storage location for a local copy of the digital content. Several steps are avoided since the download is direct from the media channel 30 to the player 20 and is transparent to the user. The user must specify the type of player 20 in the player selection field 81 to indicate the type of the player 20. Optionally, if the user wants to make a local copy on the computer 9 at the same time, they specify the download location in the download location input field 82. Once these fields 81, 82 have been specified, the user commences the download process by clicking the "Download Now" button 83.

The download module is able to maintain the digital rights of the content creator of the digital content 5.

The user interface 80 comprises a plurality of columns including: title of the digital content 5, file size of the digital content 5, release date of the digital content 5 and brief description of the digital content 5; a checkbox associated with each digital content to indicate whether the digital content 5 is to be downloaded. Other columns include the name of the media channel 30, author of the digital content 5, artwork, URL of the digital content and language of the digital content 5.

A conversion module 12 is also provided to convert the received digital content to a video file 40. The video file 40 ensures the digital content is consumed in the same order that the digital content is published in the media channel 30 by the content creator.

Although the system 10 has been described as a client application residing on a desktop computer 9, it is envisaged that the system 10 may be a server side application operating in an Application Service Provider (ASP) model. In such a scenario, the user interface is provided in a web page which allows the user to specify the media channel 30 and digital content to download and the details of their player 20. The full details of the player 20 may already be stored on database on the server side, otherwise a query to the connected player 20 is made, and the results of the query are uploaded to the server side. Next, when the user confirms the download is to proceed, the downloading and conversion occurs on the server-side and the video file 40 is saved to the player 20.

Figure 11:
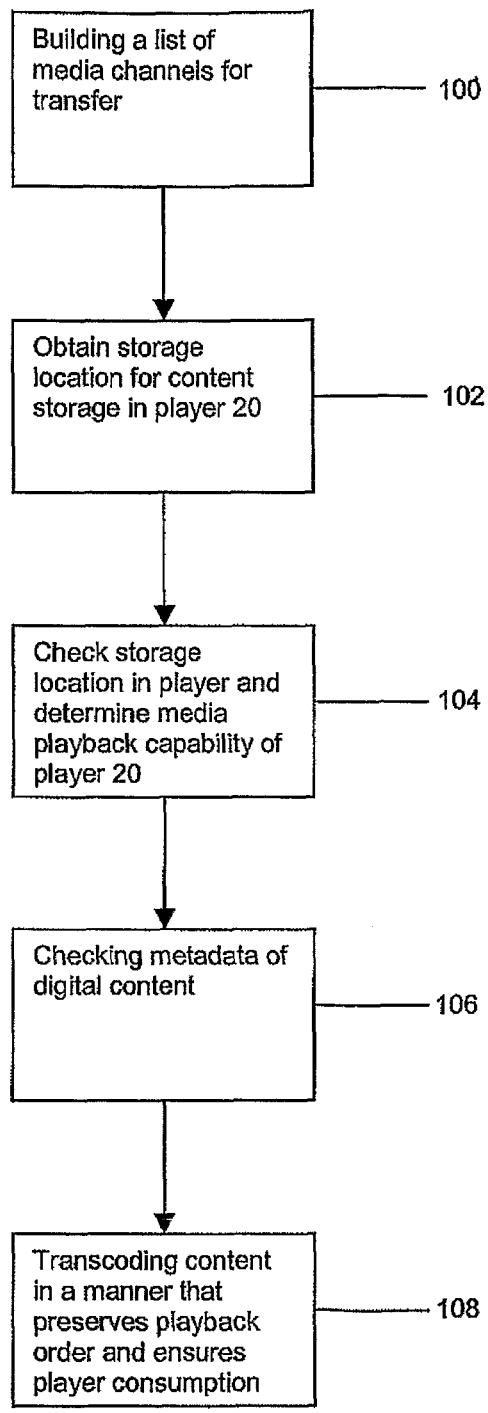
FIG. 11 is a process flow of the download module in accordance with a preferred embodiment of the present invention.

FIG. 11 shows a flow diagram of an alternative method of downloading digital content into the player 20 which may ensure that the digital content is consumed in the same order that the digital content is published in the media channel 30 by the content creator. The download module may build a list of media channels for transfer to the player 20 (100). The list may be defined by the user or automatically generated based on the user's profile/preference. The download module then obtains information in relation to the player 20 and determines a storage location for the digital content on the player 20 (102). The storage location is checked and the media playback capability of the player 20 is determined (104). The storage location and the media playback capability of the player 20 and may determine the type of digital content being downloaded into the player 20. For example, audio-only content may be stored in a folder labelled as "audio", video content may be stored in a folder labelled as "video" and so forth.

Subsequently, metadata of the digital content is checked (106) and the order of consumption of the digital content is determined by the metadata. This may include the renaming of files or arranging the files for consumption in a specific order. If necessary, the content may also be transcoded into a format (108) that preserves the order of consumption and enables the player 20 to recognise and consume the digital content. For example, an audio-only file may be converted to a video file (for video-enabled players), a video file may be converted to an audio-only file (for non video-enabled players) and so forth. It should be noted that digital content that cannot be transcoded and consumed by the player 20 will not be downloaded into the player 20.

The download module may also insert additional content during the downloading and/or transcoding process. The additional content may be notices (like informing the user of a firmware upgrade), advertisements and the like. The additional content may be updated periodically at pre-set intervals or every time downloading and/or transcoding occurs. The additional content may be associated with media channels in relation to content. The additional content may be solely audio, text or video.

It will be appreciated by persons skilled in the art that numerous variations and/or modifications may be made to the invention as shown in the specific embodiments without departing from the scope or spirit of the invention as broadly described. The present embodiments are, therefore, to be considered in all respects illustrative and not restrictive.

We claim:

1. A method for downloading video related digital content to a portable media player which is one of video enabled and non-video enabled, the video related digital content being published in a media channel by a content creator, the method comprising:

receiving the video related digital content from the media channel via a communication medium;

building a list of media channels for transfer to the portable media player;

obtaining information from the portable media player for determining storage location of the video related digital content on the portable media player; and downloading the video related digital content to the portable media player;

wherein the video related digital content is consumed by the portable media player in the same order that the video related digital content is published in the media channel by the content creator, wherein when the video related digital content is downloaded to a non-video enabled portable media player, the video related digital content is able to be consumed in the same order that the video related digital content is published, except only with audio and without any images, wherein the video related digital content is associable with metadata and the method further comprises checking metadata of the video related digital content to determine order of consumption of the video related digital content, wherein checking metadata of the video related digital content comprises transcoding the video related digital content into a format that preserves order of consumption and enables the portable media player to recognize and consume the video related digital data, and wherein downloading, into the portable media player, of video related digital content incapable of being transcoded and consumed by the portable media player is impeded.

2. The method according to claim 1, wherein the list is built based on at least one of user definition, user profile and user preference.

3. The method according to claim 1, the method further comprising:

checking the storage location and determining media playback capability of the portable media player.

4. The method according to claim 1, wherein checking metadata of the video related digital content comprises one of renaming files and arranging files for consumption in a specific order.

5. The method according to claim 1, the method further comprising:

inserting additional content during at least one of downloading the video related digital content to the portable media player and transcoding the video related digital content.

6. The method according to claim 5, wherein the additional content comprises at least one of notices and advertisements.

7. The method according to claim 6, wherein the additional content is capable of being one of:

updated periodically at pre-set intervals; and updated during at least one of downloading the video related digital content to the portable media player and transcoding the video related digital content.

8. The method according to claim 1, the method further comprising:

providing a download module to receive the video related digital content from the media channel via a communication medium and to transmit the video related digital content to the portable media player, wherein the video related digital content is transmittable to the portable media player without making a local copy.

9. The method according to claim 1, the method further comprising:

providing a user interface to be displayed to the user in response to a user action, the user interface enabling video related digital content to be selectively downloaded directly to the portable media player.

10. The method according to claim 9, the method further comprising:

providing a download module to receive the selected video related digital content from the media channel via a communication medium and to transmit the selected video related digital content to the portable media player, wherein the selected video related digital content is transmittable to the portable media player without making a local copy.

* * * * *